United States Patent
Sakakura

(10) Patent No.: US 6,785,819 B1
(45) Date of Patent: Aug. 31, 2004

(54) AGENT METHOD AND COMPUTER SYSTEM

(75) Inventor: Takashi Sakakura, Tokyo (JP)

(73) Assignee: Mitsubishi Denki Kabushki Kaisha, Tokyo (JP)

( * ) Notice: Subject to any disclaimer, the term of this patent is extended or adjusted under 35 U.S.C. 154(b) by 0 days.

(21) Appl. No.: 09/508,644
(22) PCT Filed: Nov. 6, 1998
(86) PCT No.: PCT/JP98/04995
§ 371 (c)(1),
(2), (4) Date: Mar. 15, 2000
(87) PCT Pub. No.: WO00/28428
PCT Pub. Date: May 18, 2000

(51) Int. Cl.[7] .............................................. G06F 13/12
(52) U.S. Cl. ...................... 713/200; 713/201; 713/168; 713/182; 713/189; 713/193
(58) Field of Search ................................ 713/168, 182, 713/189, 193, 200, 201

(56) References Cited

U.S. PATENT DOCUMENTS

| | | | |
|---|---|---|---|
| 5,603,031 A | 2/1997 | White et al. | |
| 5,632,011 A | 5/1997 | Landfield et al. | |
| 5,678,002 A | * 10/1997 | Fawcett et al. | ............. 345/709 |
| 5,727,950 A | * 3/1998 | Cook et al. | ................. 434/350 |

FOREIGN PATENT DOCUMENTS

JP 07-87122 3/1995

OTHER PUBLICATIONS

Sakurada et al., Mitsubishi Denki Technical Report, vol. 71, No. 2, pp. 22–25 (1997).

P. Heywood, Data Communications, vol. 27, No. 8, pp–29–30 (1998).

* cited by examiner

Primary Examiner—Thomas R. Peeso
(74) Attorney, Agent, or Firm—Birch, Stewart Kolasch & Birch, LLP

(57) ABSTRACT

Each subnet has an environment for executing the agent service program. When a request for service such as file system is made from the subnet B103 to the subnet A102 by a user, a client side agent created at the subnet B103 further creates a peer agent, and the peer agent is transmitted to the subnet A102 according to the communication condition such as a firewall 104 which is already being notified. A peer-to-peer session is configured between the agents.

19 Claims, 17 Drawing Sheets mount netA.machineA:/export1 /netA/machineA/export1

| PATHS | INFORMATION EXCHANGING METHODS | STANDARD TRANSFERRING RATES | DYNAMIC TRANSFERRING RATES |
|---|---|---|---|
| A—B | SMTP | 32 | 38 |
| A—C | TCP | 128 | 111 |
| B—C | SMTP | 32 | 30 |

901
902
903

- SUBNET NAME — 1001
- MACHINE NAME — 1002
- DEPENDENCY LIST — 1003
- OWNER NAME — 1004
- EXECUTION OBJECT — 1005

FIG.14

| PATHS | DATA EXCHANGING MEANS | STANDARD TRANSFERRING RATES | DYNAMIC TRANSFERRING RATES |
|-------|----------------------|----------------------------|---------------------------|
| A−B | SMTP | 32 | 38 |
| A−C | TCP | 128 | 111 |
| B−C | SMTP | 32 | 30 |
| A−D | SMTP | 32 | 32 |
| B−D | SMTP | 32 | 32 |
| C−D | TCP | 10240 | 10240 |

| AgentID | processingUnit | status |
|---|---|---|
| netA.machine1.0001 | netA.machine1 | wait |
| netA.machine1.0002 | netC.machineA | running |
| netA.machine1.0003 | netC.machineB | running |
| netA.machine1.0004 | netD.machineA | running |
| netA.machine1.0005 | netD.machineB | running |

1601
1602
1603
1604
1605

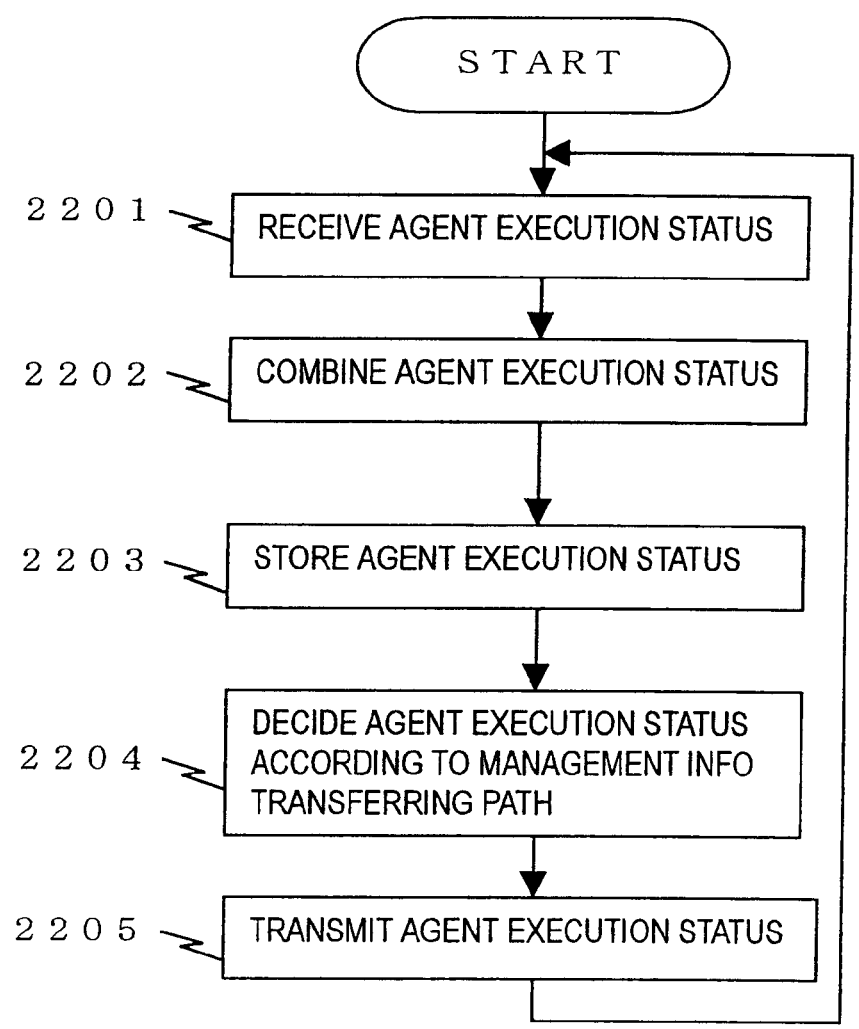

AGENT METHOD AND COMPUTER SYSTEM

This application is the national phase under 35 U.S.C. §371 of PCT International Application No. PCT/JP98/04995 which has an International filing date of Nov. 6, 1998, which designated the United States of America.

TECHNICAL FIELD

The present invention relates to a service supplying method between computer systems such as LAN (local area network) connected via an internet or a public channel and a computer system that uses the service supplying method. The computer system and the service supplying method of the present invention supplies a service safely and smoothly to a user, and this is made possible by the agent method.

BACKGROUND ART

Recently, a computer system that uses LAN is commonly being adopted in organizations. Commonly, a plurality of LANs located in various locations in an organization's interoffice network are connected altogether to form an intranet. Extending further, an extranet which includes the organization's allied companies to form a network altogether is also becoming widespread.

There are various ways to connect a plurality of LANs located in various locations. To give one example, there is a case of using a low-cost internet instead of a leased line. In this case, access from outside should be regulated, so a firewall is generally set at a boundary of outside and inside of the network. This helps to increase the safety factor inside the LANs. The firewall is a technique which only permits access from outside to a specific location or to a specific application of the LAN. An example of this technique is disclosed in Japanese unexamined patent publication HEI 7-87122.

Specifically, the firewall is mostly used in a system which only allows SMTP (simple mail transfer protocol), which is an electronic mail transfer protocol, to pass through. In this case, only an electronic mail message can pass through the firewall. As other examples, there are a system which allows HTTP (hyper text transfer protocol) to pass through, which is a data communication protocol of WWW (world wide web), a system which allows a CORBA (common object request broker architecture) communication protocol IIOP (internet inter-ORB protocol) to pass through, and a system which allows a communication protocol such as RMI prepared by JAVA processing system to pass through.

In a network computer system, services under a LAN environment such as file sharing, printing to common printer, or use of CPU server cannot be adopted because of the firewall.

Accordingly, in cases when one wishes to obtain a certain data or a program from other location, then the one can only rely on someone at the other location to transmit a required data or the program using an independent channel, or the one can only rely on a method of mailing media such as a tape.

The present invention attempts to eliminate disadvantages of conventional techniques such as those described above. An objective of the present invention is to request from outside via the internet for the services of computer system such as LAN where the firewall is being installed, and aims to supply a method to safely and smoothly receive the services.

A detailed example of the agent method adopted in the present invention is disclosed in Japanese unexamined patent publication HEI 7-182174 (corresponding to Japanese application U.S. Pat. No. 5,603,031 by General Magic Inc., U.S. company). An agent moves between agent processing systems responding to its needs. That is, the agent is configured to execute processing based on a data and a processing procedure stored in itself.

Also, as a related technique, a technique to set a delivery destination database and to manage the database in one-dimension in order to deliver an electronic mail to a plurality of LANs connected to the internet via the firewalls is disclosed in U.S. Pat. No. 005632011A. This system is configured to transmit an updated data of the delivery destination database as an electronic mail message.

DISCLOSURE OF THE INVENTION

According to one aspect of the present invention, an agent method for transferring an agent inside a network system including a first computer system having an access control unit which allows access in case of meeting a pre-determined communication condition and a second computer system, comprises steps of:

authenticating the second computer system for transmitting the agent, and transmitting the pre-determined communication condition of the first computer system to the authenticated second computer system;

receiving and storing the pre-determined communication condition, creating the agent, and transmitting the agent according to the pre-determined communication condition by the second computer system; and receiving the agent via the access control unit and executing the agent by the first computer system.

According to another aspect of the present invention, the agent method further comprises a step of authenticating an agent issuing user.

According to another aspect of the present invention, the agent method includes the first computer system which can use a plurality of information exchanging methods. The agent method further comprises a step of selecting an information exchanging method based on an attribute of the information exchanging method of the first computer system by the second computer system.

According to another aspect of the present invention, the agent method includes the first computer system which has a plurality of agent processing systems that can execute the agent. The step of creating the agent includes a step of selecting the agent processing system based on an attribute of the agent processing system and a step of writing an identification information of the selected agent processing system to a part of the agent. The step of executing the agent includes a step of reading the identification information of the selected agent processing system and a step of transferring the agent to an agent processing system specified by the identification information.

According to another aspect of the present invention, the agent method includes the step of creating the agent including a step of writing an identification information of an agent issuing user to a part of the agent. The step of executing the agent includes a step of reading the identification information of the agent issuing user and a step of accessing a service according to an access right of the agent issuing user specified by the identification information.

According to another aspect of the present invention, the agent method further comprises a step of transmitting an agent execution status by the first computer system and a step of receiving the agent execution status by the second computer system.

According to another aspect of the present invention, the agent method further comprises a step of encrypting at least a part of the agent by the second computer system, and a step of decrypting the encrypted part of the agent by the first computer system.

According to another aspect of the present invention, the agent method further comprises a step of combining the predetermined communication conditions of a plurality of the first computer systems.

According to another aspect of the present invention, the agent method includes a second computer system which can use a plurality of information exchanging methods. The agent method further comprises a step of storing an agent transmission log including an identification information of the information exchanging method used in transmitting the agent, and a step of selecting the information exchanging method based on the agent transmission log by the second computer system.

According to another aspect of the present invention, the agent method includes the step of authenticating the second computer system includes a step of authenticating by a third party authenticating center.

According to another aspect of the present invention, the agent method further comprising a step of transmitting an user authentication data, and a step of receiving and storing the user authentication data by a plurality of the second computer systems, wherein the step of authenticating the agent issuing user includes a step of reading the user authentication data by the second computer system.

According to another aspect of the present invention, the agent method further comprising a step of combining attribute data of the agent processing systems, wherein the step of selecting the agent processing system includes a step of reading combined attribute data of the agent processing systems.

According to another aspect of the present invention, the agent method further comprises a step of combining the agent execution statuses.

According to another aspect of the present invention, the agent method further comprises a step of defining a management information transferring path based on an information exchange path information, and a step of deciding a transmitting destination of the agent execution status according to the management information transferring path.

According to another aspect of the present invention, the agent method further comprises a step of defining a management information transferring path based on an information exchange path information, and a step of deciding a transmitting destination of the pre-determined communication condition according to the management information transferring path.

According to another aspect of the present invention, a computer system having an accessible access control unit in case of meeting a pre-determined communication condition, and for communicating with an other computer system, comprises the followings:

a computer system authenticating unit for authenticating the other computer system for transmitting an agent;

a communication condition transmitting unit for transmitting the pre-determined communication condition to the authenticated other computer system;

an agent receiving unit for receiving the agent via the access control unit; and an agent execution unit for executing the agent.

According to another aspect of the present invention, a computer system for communicating with an other computer system having an accessible access control unit in case of meeting a pre-determined communication condition comprises:

a communication condition receiving unit for receiving the pre-determined communication condition of the other computer system;

a communication condition storing unit for storing the pre-determined communication condition of the other computer system;

an agent creating unit for creating an agent executed in the other computer system; and an agent transmitting unit for transmitting the agent according to the pre-determined communication condition of the other computer system.

According to another aspect of the present invention, the computer system comprises a network system having a plurality of computer systems.

According to another aspect of the present invention, the computer system comprises a network system having a plurality of computer systems.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14 illustrates an example of the information exchanging path management table of the agent mechanism after participation by a subnet D of the present invention;

FIG. 16 illustrates an example of agent execution status inquiry of the present invention;

FIG. 22 illustrates a process flow including process of combining execution status of the agent of the present invention.

BEST MODE FOR CARRYING OUT THE INVENTION

Hereinbelow, embodiments of the present invention are described.

Embodiment 1

Figure 17:
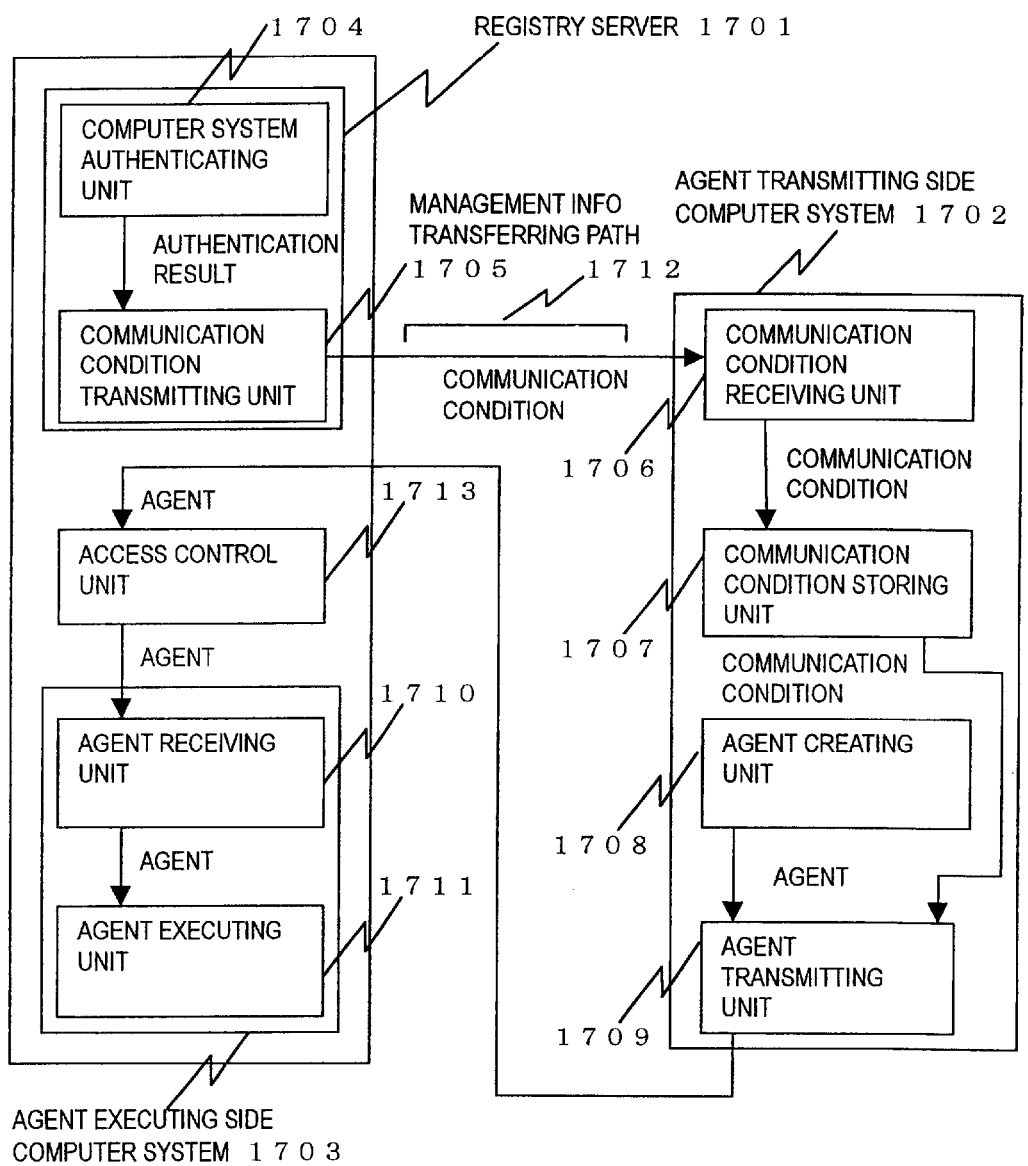
FIG. 17 outlines a data flow and a system configuration of the present invention.

Process of the present invention is performed on a configuration illustrated in FIG. 17. The data flow is outlined in the drawing of FIG. 17. Particularly, the present embodiment shown in FIG. 17 describes en the process flow including processes of creating and transmitting the agent by using the agent transmitting side computer system 1702 with reference to the drawing of FIG. 20. As well, the present embodiment describes on the process flow including processes of receiving and executing the agent by using the agent executing side computer 1703 with reference to the drawing of FIG. 21. The present invention is described next assuming a specific network system. In this example, an agent processing system 205 of subnet B103, which will be described later, corresponds to an agent transmitting side computer system. An agent processing system 205 of subnet A102, which will be described later, corresponds to the agent executing side computer system 1703.

Figure 1:
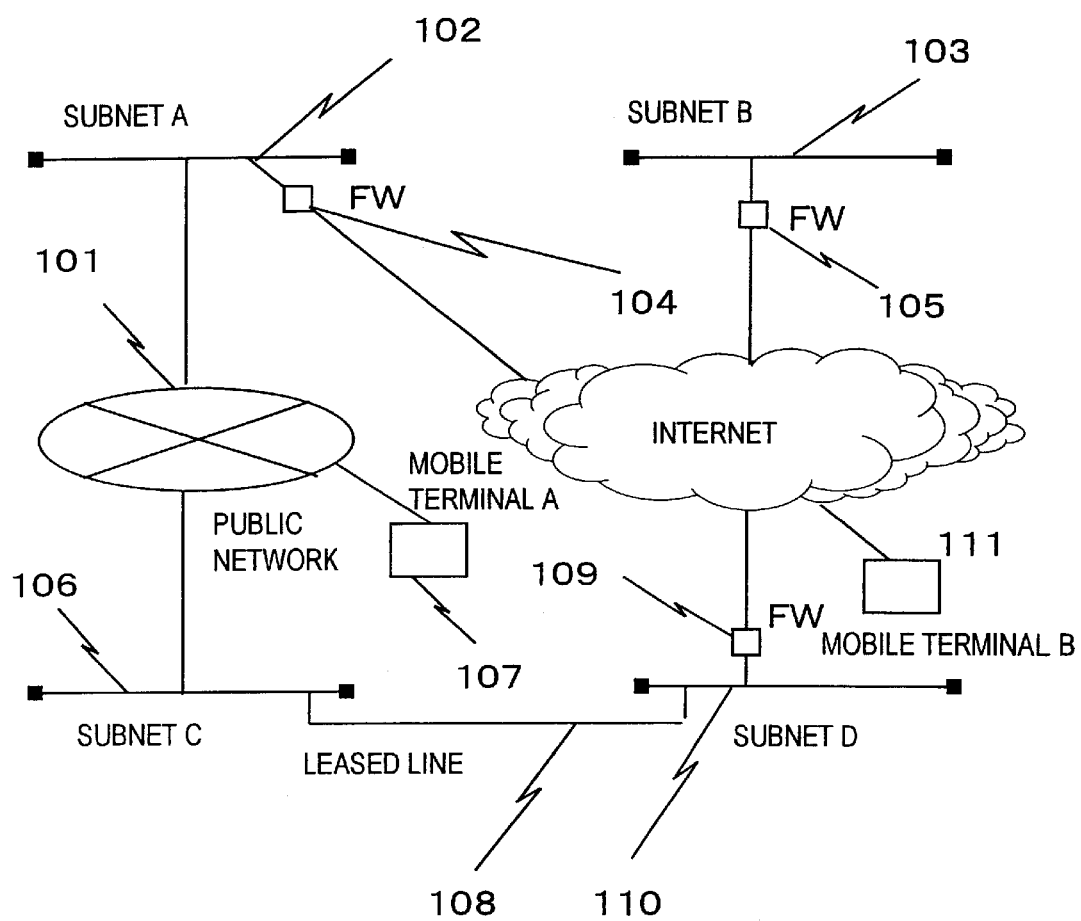
FIG. 1 illustrates a network configuration of the computer system of the present invention.

As an example of the present embodiment, a method of supplying a wide-area file system and its network system is described based on a network comprising the computer systems shown in FIG. 1.

The network having the computer systems shown in FIG. 1 is used in an organization with 1000 employees, for example, comprises a subnet A102, a subnet B103, a subnet C106 and a subnet D110. These subnets correspond to the computer systems that uses LANs which are set in their respective positions.

The subnet A102 and the subnet C106 are connected to a general public network 101 via a server. The server performs a modem connection on demand when required IP (internet protocol) packets are received.

A user of the subnet A102 can access an application program that operates on a computer of the subnet C106 in the same way as accessing an application program which operates on a computer of the subnet A102. Similarly, a user of the subnet C106 can access the application program that operates on the computer of subnet A102. However, a transferring rate will decline to about 1/100 of the transferring rate within the same subnet. The transferring rate may decrease more at congestion.

The subnet C106 and the subnet D110 are connected by a high-speed dedicated line 108, and the computer of subnet C106 can handle a computer of the subnet D110 as if it is a computer within the same network, and vice versa. However, an excessive traffic of the dedicated line caused by user operation must be controlled.

The subnet B103 is connected only to the internet via a firewall 105. The firewall 105 is configured to only permit communication based on the SMTP (mail transfer protocol) for the connection of the subnet B103 and the internet.

Similarly, the subnet A102 is connected to the internet via a firewall 104. Also, the subnet D110 is connected to the internet via a firewall 109. Similar to the firewall 105, the firewalls 104 and 109 are configured to only permit communication recorded on the SMTP for their respective connections.

A mobile terminal A107 can be connected to the subnet A102 or the subnet C106 through a modem and via the public network. Also, the mobile terminal A107 can be connected to the internet via the public network by using an internet connection service. Similarly, a mobile terminal B111 is connected to the internet.

Figure 2:
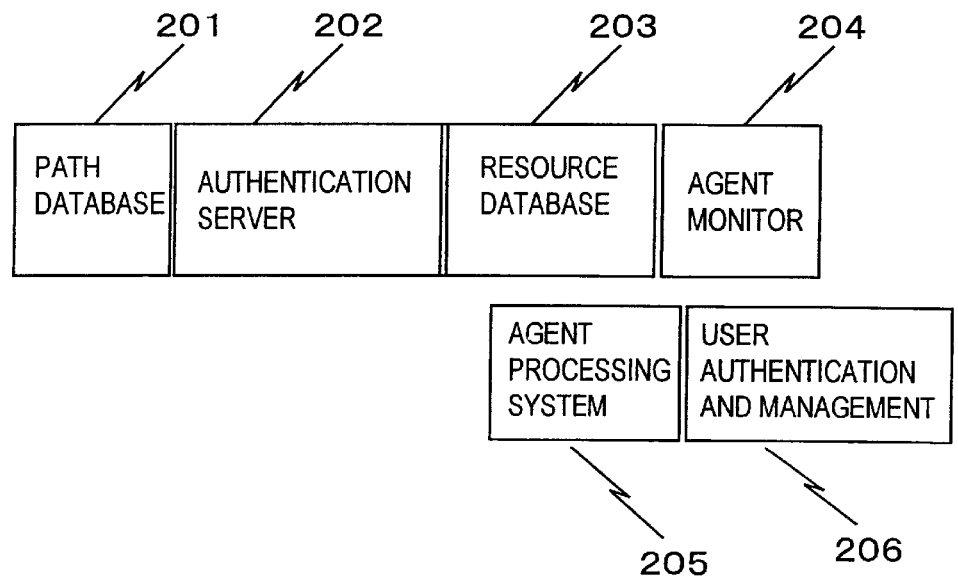
FIG. 2 illustrates a configuration of agent service programs in a subnet of the present invention.

The configuration of agent service programs of a subnet is described with reference to FIG. 2. A path database 201; an authentication server 202; a resource database 203; an agent monitor 204; an agent processing system 205; and an user authentication and management 206 are services made of software. These services can be executed in any one of the computers in a subnet.

Figure 5:
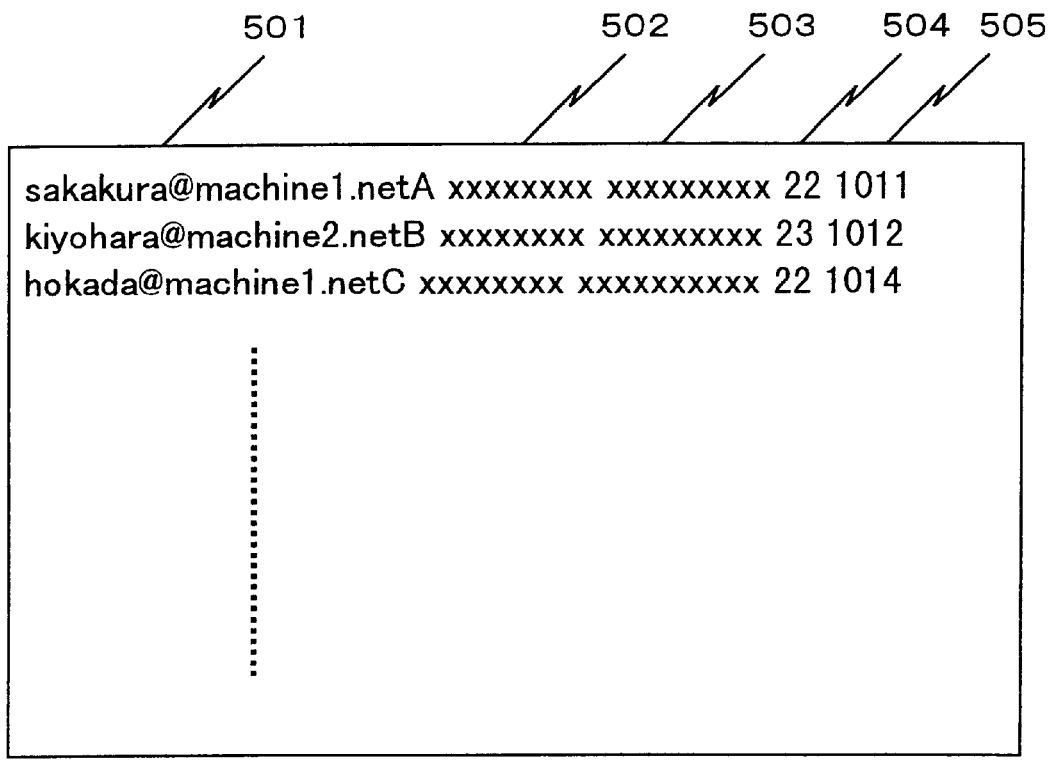
FIG. 5 illustrates an example of agent mechanism user management table of the present invention.
Figures 9, 10:
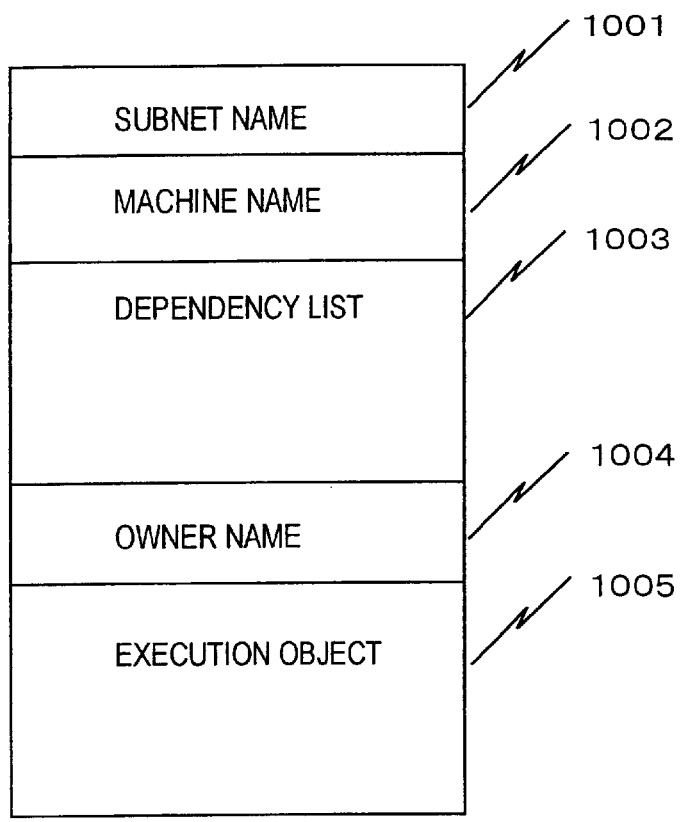
FIG. 9 illustrates an example of information exchanging path management table of the present invention.
FIG. 10 illustrates a configuration of agent of the present invention.

The path database 201 manages the information exchanging path management table which is illustrated in FIG. 9. The authentication server 202 authenticates that a specific subnet is one of the subnets that participates to the network system. The resource database 203 manages resource informations illustrated in FIG. 11. The agent monitor 204 monitors an agent execution status. The agent processing system 205 supplies a necessary function for processing the agent. The user authentication and management 206 manages the agent mechanism user management table which is illustrated in FIG. 5.

The agent of the present invention is an executing object which can move between the agent processing systems. The agent of the present invention can use the services 201 to 206 operating in a subnet via API (application programming interface). The API is supplied by the agent processing system 205.

Figure 3:
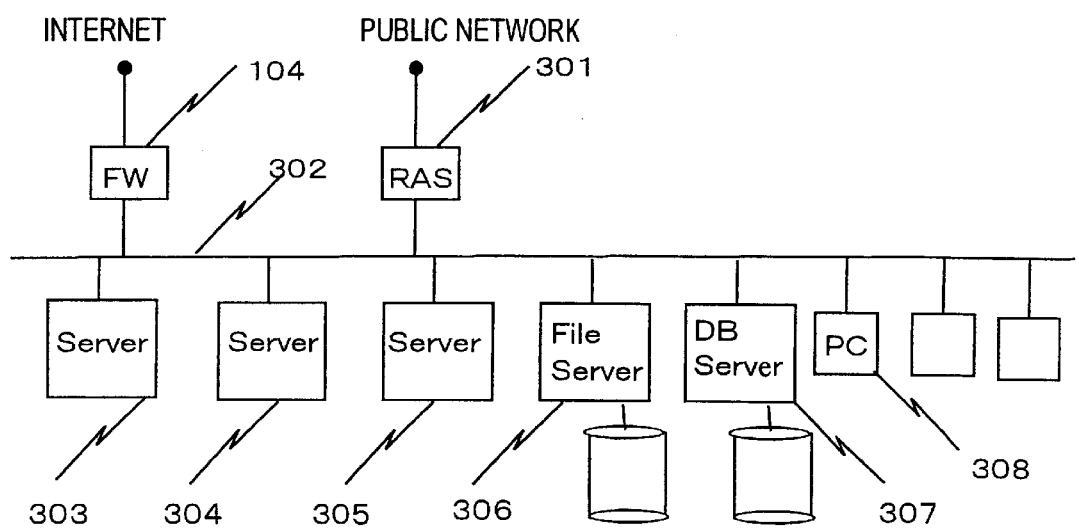
FIG. 3 illustrates a hardware configuration of a subnet of the present invention.

The hardware configuration of a subnet is described with reference to the drawing of FIG. 3. The hardware configuration of the subnet A102 is taken as an example. A LAN 302 of the subnet A102 is connected to the internet via the firewall 104. Also, the LAN 302 of the subnet A102 is connected to the public network via a remote access server 301. Further, servers 303 to 307 are connected to the LAN 302. A server 303 executes the path database 201 and the authentication server 202. A server 304 executes the resource database 203 and the agent monitor 204. A server 305 executes the agent processing system 205 and the user authentication and management 206. A server 306 is a file server. A server 307 is a database server. A numerous number of other PC (personal computer) clients 308 are connected to the LAN 302.

Figure 4:
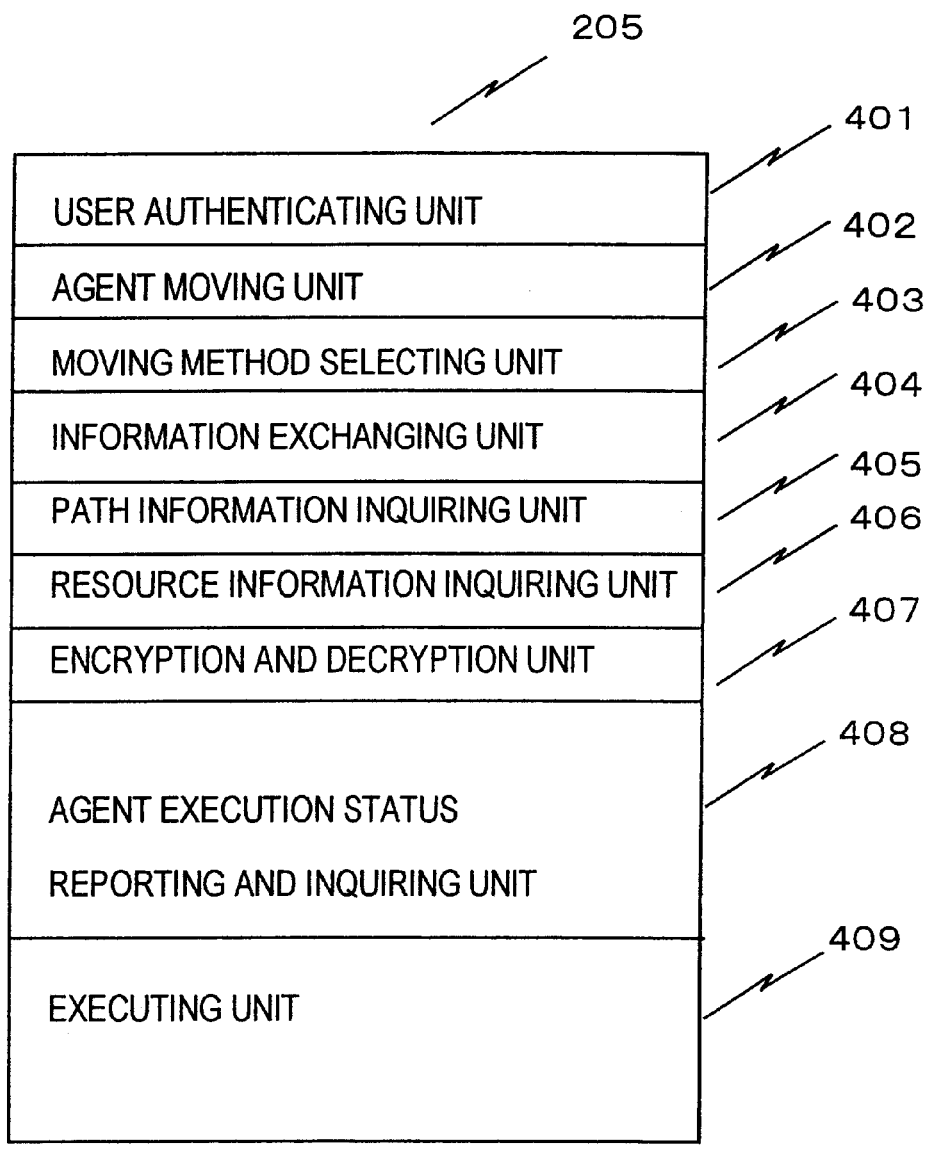
FIG. 4 illustrates a functional configuration of agent processing system of the present invention.

The drawing of FIG. 4 illustrates the functional configuration of the agent processing system 205.

The agent processing system 205 comprises of the following units: a user authenticating unit 401; an agent moving unit 402; a moving method selecting unit 403; an information exchanging unit 404; a path information inquiring unit 405; a resource information inquirying unit 406; an encryption and decryption unit 407; an agent execution status reporting and inquiring unit 408; and an executing unit 409.

The user authenticating unit 401 authenticates a user by entering an agent into the agent processing system through an application program, for instance a file system (step 2001). The agent moving unit 402 is used for moving the agent between the agent processing systems. The moving of agent is performed responding to needs of the agent (steps 2006 and 2101). The moving method selecting unit 403 selects an optimal moving method for moving the agent between the agent processing systems (step 2005). The information exchanging unit 404 performs an information exchanging for moving the agent or for transmitting and receiving data (steps 2006, 2101, 1901, 1904, 1905, 1908, 1909, 1912, 1913, 1916, 1917, 1920, 1813 to 1816, 2110, 2112, 2114, 2116, 2201, and 2205). The path information inquiring unit 405 inquires for a path information in selecting an optimal information exchanging path used for the information exchanging (steps 1811, 1812, 1903, 1907, 1911, 1915, 1919, and 2004). The resource information inquiring unit 406 inquires for an information related to resources such as file system and database that can be used by a user in the agent processing system (step 2015). The encryption and decryption unit 407 encrypts a data, for concealing, before transmitting the data upon the information exchanging for transmitting and receiving the data and for moving the agent, and after receiving the data, it is decrypted (step 2003, 2102). The agent execution status reporting and inquiring unit 408 inquires the execution status of the agent of the present system (steps 2104 and 2008). The executing unit 409 executes the agent (step 2103).

Taking an operation of the wide-area file system implemented by the agent method of the present invention as an example, an operation of the agent processing system of the present invention and an operation of each service are described next. However, note that the subnet D110 is not registered in the present agent mechanism system at a current stage. The subnet D110 is registered to the present agent mechanism in an embodiment which will be described later.

The operation of file system firstly sends an agent to an agent processing system which is accessible to the file system, configures a peer-to-peer session between agents by using the agent mechanism which is a secure communication mechanism, and then performs the file system operation. That is, the file system operates by installing a dedicated file server at a required site.

Prior to transmitting the agent, the agent processing system authenticates user of the present system (step 2001). The agent processing system prepares an user interface and API for loading and executing the agent. In cases of using the user interface, the agent processing system requests for inputting a password at login to the agent processing system.

An inputted password is referred to authenticate an authorized user. On the other hand, in cases when an application program uses the API, the agent processing system uses a password which is a parameter to the API, refers to this password in a similar way, and authenticate the authorized user.

The drawing of FIG. 5 illustrates the example of agent mechanism user management table. This is a table in a database used by the agent processing system to authenticate the user. This table is managed by the user authentication and management 206. In this table, the following items are provided per user: a user name 501; a password 502 which is encrypted using a hash function; a common secret key 503 for encryption; a group ID 504 of the present system; and a user ID 505 of the present system. The user name 501 comprises of a name of host where a user registered agent processing system operates, a name of subnet, and a name of user, such that the user name 501 will be consistent in the system.

The user authenticating unit 401 of the agent processing system 205 obtains this table from a function of the user authentication and management 206 of a subnet, and an obtained table is used for authenticating the user (step 2009). The user authentication and management 206 of all the subnets maintain the most recent and identical table. This is made possible by a protocol which will be described later (steps 1802 to 1804, 1814, and 1905 to 1908).

Figure 6:
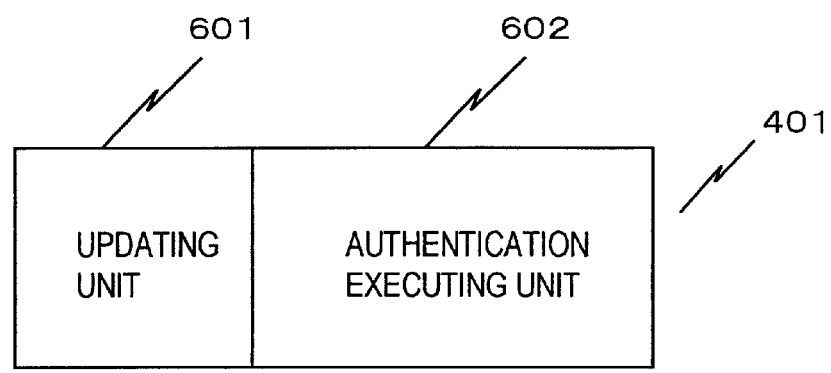
FIG. 6 illustrates a functional configuration of user authenticating unit of the present invention.

The functional configuration of the user authenticating unit 401 of the agent processing system 205 is described with reference to the drawing of FIG. 6. The user authenticating unit 401 comprises of an updating unit 601 and an authentication executing unit 602. The updating unit 601 registers and deletes a user under a permission of supervisor of the system (steps 1802 to 1804). The updating unit 601 is configured to transmit and receive an updated data with functions of user authentication and management 206 of all subnets (steps 1814, 1905, and 1908). On the other hand, the authentication executing unit 602 is configured to authenticate the user. Specifically, when a request for authenticating the user is received, together with a user name and a password, the user is referred from the user name and the password, and a result of the user authentication is returned (step 2001).

Figures 7, 8:
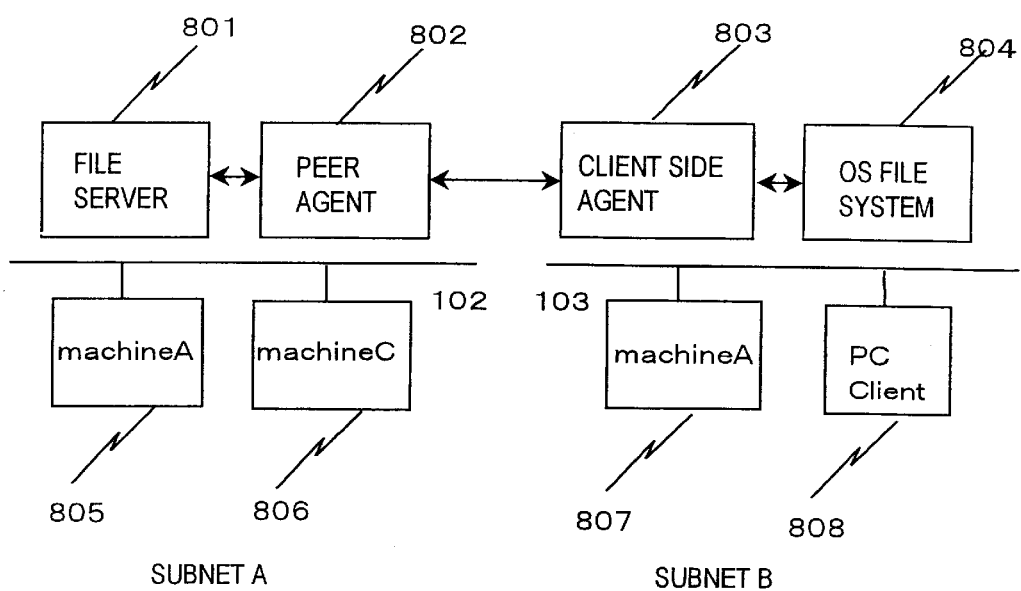
FIG. 7 illustrates a command example of file system of the present invention.
FIG. 8 illustrates a configuration of file system session of the present invention.

Using the present agent mechanism, when a command shown in the drawing of FIG. 7 is executed, the file system session illustrated in the drawing of FIG. 8 is configured.

The command shown in FIG. 7 is executed in a PC client 808 in the subnet B103. It is a command to use when wanting to assign other file system to a file system 804 which is a part of OS (operating system) of the PC client. Specifically, a meaning of the command is "a directory called/export1 of a machine A805, which operates a file server 801 of the subnet A102, is assigned to/netA/machineA/export1 in the PC client 808". By executing this command, the OS transmits an agent for transmitting and receiving file data by peer-to-peer to an agent processing system of the subnet B103. This transmission of the agent is performed via a listening port prepared by the agent processing system.

A client side agent 803 secures a communication path with a client function of the file system 804 of the OS by using a socket. The client side agent 803 creates a peer agent 802 (step 2002), and transmits a created peer agent 802 to a destination site by using the agent mechanism (step 2006). As the processing system which is targeted as the destination site, the one that is most suited for executing the agent is selected based on a result of the inquiry such as attributes of the communication path, system resource, and agent execution status (step 2010). The peer agent is an agent which is one end of the peer-to-peer, which will be described in detail based on the drawing of FIG. 8 later on.

The configuration of the file system session is described with reference to FIG. 8. A machineA 805 is a server machine of the subnet A102 where the file server 801 operates. A machineC 806 is a server machine of the subnet A102 where the agent processing system operates that executes the peer agent 802. The PC client 808 is a PC client on the subnet B103 which has issued a mount command, where a file system 804 operates as a part of the OS. A machineA 807 is a server machine of the subnet B103 where the agent processing system operates which executes the client side agent.

Continuing on, how the files below/netA/machineA/export1 are accessed from an application program of the PC client is described.

When the mount command ends after the session is established accordingly, an OS file system 804 permits the application program of the PC client to access the files below/netA/machineA/export1. When the application program issues commands such as create file, delete file, read file, update file, and refer to the directory for the OS file system 804, then the OS file system 804 transmits a data related to the commands to the client side agent 803 in the same subnet. The client side agent 803 further transfers a data related to the commands to the peer agent 802. The client side agent 803 selects a communication path suited for this transfer, and transfers the data using a secure communication method using encryption.

The peer agent 802 acts as a client of the file server 801. The peer agent 802 operates file related to the commands, such as create file, delete file, read file, update file, and refer to the directory. The peer agent 802 transfers a result of the file operation to an agent 803.

The agent 803 transfers the result of file operation further to the OS file system 804. Further, the OS file system 804 returns the result of file operation to the application program. A series of processing for the commands issued by the application program to the OS file system 804 ends here.

For a service that can be used by the agent processing system such as the OS file system 804, when an access permission is being set in the service, then an agent issuing user is specified from an owner name 1004 in the agent. The service is accessed under the permission of this agent issuing user (step 2108).

The agent mechanism of the present invention operates as described and as outlined as in the example of file system above.

Continuing on, following steps are particularly described in detail: selecting the agent moving method (step 2005); creating the agent (step 2002); selecting the agent processing system (step 2010); moving the agent (steps 2006 and 2101); and commencing the service (step 2103).

First of all, the selecting of the agent moving method (step 2005) is described.

The example of information exchanging path management table is illustrated in the drawing of FIG. 9. This is a table in a database for managing an information related to the information exchanging path between the subnets. This table is managed by the path database 201. In the table, three information exchanging paths between the subnets are shown, namely: A–B shown on line 901, A–C shown on line 902, and B–C shown on line 903. For every one of the information exchanging paths, the following items related to their respective attributes are set: an information exchanging method; a standard transferring rate; and a dynamic transferring rate.

The agent obtains the information of this table by inquiring to the path database 201 via the path information inquiry unit 405 of the agent processing system (step 2004). Then, the agent selects an optimal information exchanging path for transmitting and receiving the data and for moving of the agent (steps 2005 and 2013).

Provided an example of transmitting a peer agent to the subnet A102 by the client side agent 803 of the subnet B103, from an entry of A–B shown in the line 901 of the table, a data exchanging means of the path A–B, which will act as a transmission path, is a communication method based on the SMTP, and it can be seen that a most recent transferring rate result recorded is 38 kbps. Accordingly, a transmission log including a recorded result of this transmission and the information exchanging path used in this transmission is stored, and a stored transmission log can be made to be used as a deciding element for next selection (steps 2007 and 2014).

Under a circumstance when the agent processing system is managed by dividing the subnet into a plurality of domains, the information exchanging path may further be divided into layers. Also, a configuration in which the agent processing system automatically selects the information exchanging path may be considered, instead of the agent selecting it.

The creating of agent is described next.

The drawing of FIG. 10 illustrates the configuration of agent. The agent comprises the following; a subnet name 1001, a machine name 1002, a dependency list 1003, an owner name 1004, and an execution object 1005.

The subnet name 1001 is a name of the subnet where a server machine belongs to. The agent processing system operates in this server machine (step 2011). The machine name 1002 is a name of the server machine where the agent processing system operates (step 2011). The dependency list 1003 lists a dependency condition such as performance of the agent processing system and resources necessary for operating the agent. The owner name 1004 is a user ID indicating an owner of the agent (step 2012). These management information are provided at a time of creating the agent (step 2002).

The execution object 1005 is an object which is executed as an agent. The execution object 1005 is encrypted and decrypted by the common secret key 503 registered per user and an algorithm that is consistent in the agent mechanism (steps 2003 and 2102).

Operation of selecting an optimal agent processing system as a moving destination of the peer agent is described next (step 2010). The client side agent 803 inquires to the resource database 203 via the resource information inquiring unit 406 of the agent processing system in a same manner as inquiring the path database 201 (step 2015).

Figure 11:
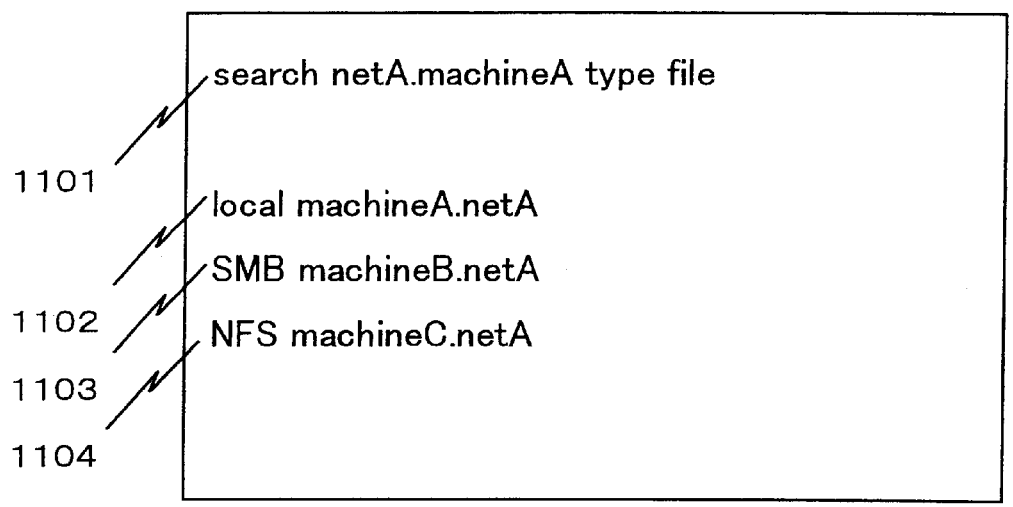
FIG. 11 illustrates an example of resource information inquiry of the present invention.

An example of inquiring the resource information is illustrated in FIG. 11. As an example, the dependency condition required for an execution of the peer agent is described as a condition that can access the file server machineA of the subnet A102.

A command shown in a line 1101 of FIG. 11 is a command for inquiring the resource database 203. A meaning of the command 1101 is "search the agent processing system that can access the file of the subnet A102". Responses to the command 1101 are illustrated in lines 1102 to 1104. A meaning of the line 1102 is "machineA of the subnet A is local". That is, the machineA of the subent A102 provided with the agent processing system is the file server itself. A meaning of the line 1103 is "machineB is access possible as SMB (server message block) client". A meaning of the line 1104 is "machineC is access possible as NFS (network file system) client".

The peer agent which will be created this time has only a function to use a NFS client interface supplied by the agent processing system, therefore, the agent processing system that should be moved is the machineC (step 2010).

Accordingly, the agent selects the machineC as the optimal agent processing system as for a peer agent destination, and registers the machineC to the machine name 1002 of the management information (step 2011).

Figure 12:
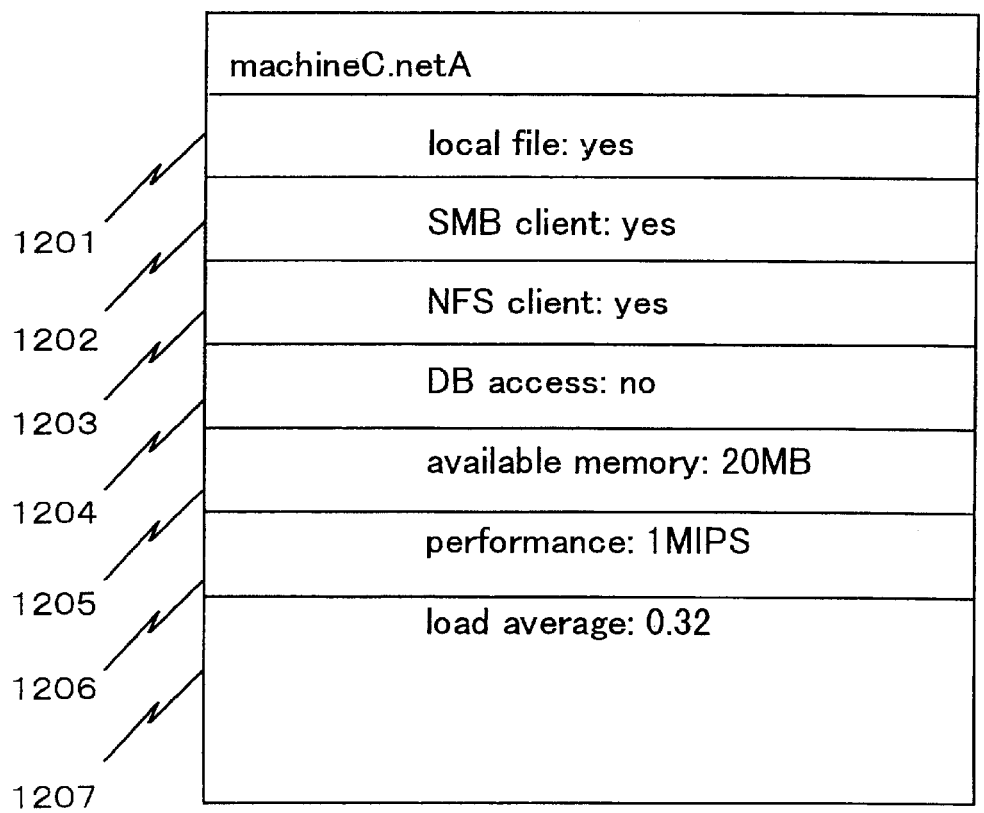
FIG. 12 illustrates an example of agent processing system attribute inquiry of the present invention.

It is also possible to inquire in reverse which resources (attributes) are provided at the agent processing system to the resource database 203 via the resource information inquiring unit 406 of the agent processing system. A result of the inquired attributes related to the agent processing system machineC is illustrated in the drawing of FIG. 12. A line 1201 shows that an access to the local file is possible. A line 1202 shows that an access as the SMB client is possible. A line 1203 shows that an access as the NFS client is possible. A line 1204 shows that an access to the database is not possible. A line 1205 shows that a capacity of the memory used by the present agent processing system is 20 MB. A line 1206 shows that a processing rate of the present agent processing system is about 1 MIPS. A line 1207 shows that a load of the current agent processing system is 32%.

As described previously, the moving of a peer agent is performed after a set up of the management information for transmitting the peer agent is completed (step 2006 and 2101).

The client side agent 803 requests the agent moving unit 402 of the agent processing system to transmit the peer agent to the agent processing system of machineC of the subnet A102 by selecting the communication method of SMTP which is described previously. The agent moving unit 402 selects the information exchanging unit 404 for the SMTP, and hands over to the information exchanging unit 404 the moving agent (an object defined in a broad sense in the present system) and a moving destination.

The information exchanging unit 404 transmits a connection request message to a mail account "agentlistener@machineC.netA" prepared as a port for creating connection by the SMTP communication unit of the machineC of the subnet A102. At this time, SMTP communication mail account name of the client side agentpoter@machineA.net B is also transmitted. Then the SMTP communication mail account of the server side "agentporter1@machineC.netA" is obtained.

Accordingly, a status of the secured mail accounts by both are the status of being connected by the SMTP communication means. From hereinbelow, the communication packet is taken as a mail message using this connection status, and the mail message is transmitted and received by both. The agent moving unit 402 marks an area where an object is attached that a type of this object is an agent, encrypts an execution object 1005 at the user common secret key (step 2003), and the agent is handed over to the information exchanging unit 404. The information exchanging unit 404 separates a received agent in packets of object data, and transmits the packets as the mail messages (step 2006). At this time, a digital signature may be attached to the mail message in preparation to avoiding the attacks from outside.

The information exchanging unit 404 of the agent processing system of machineC of the subnet A102 collates the object data packets of an agent, and identifies from the object type that this is the agent, and hands over the object data to the agent moving unit 402 of the agent processing system (step 2101). At this time, the machine name 1002 of the management information is read, and the agent may be transferred to an agent processing system specified by the machine name (steps 2105 and 2106).

The agent moving unit 402 specifies a user from the owner name 1004 of the management information. Using a common secret key of the user, the encryption and decryption unit 407 decrypts an encrypted execution object 1005. After that, an execution object is loaded, and the execution commences as the peer agent 802.

The peer agent 802 transmits a secured mail account address and a message when the peer agent 802 commenced execution to the client side agent 803. This transmission is performed by specifying the communication mail account address of the client side agent 803 held previously as an inner data by the moved agent, and then by commanding the information exchanging unit 404. The information exchanging unit 404 that received the transmission command regards that the connection is created, and enters a connection status. On the other hand, the client side agent 803 is already in a receive waiting status, therefore, when the client side agent 803 receives a commence processing message from the peer agent 802, the communication mail account address of the peer agent 802 is registered to the information exchanging unit 404, and notify the fact that the file system session creation is completed to the OS file system 804.

After this, the file access service becomes usable from the PC client 808.

Embodiment 2

Figure 18:
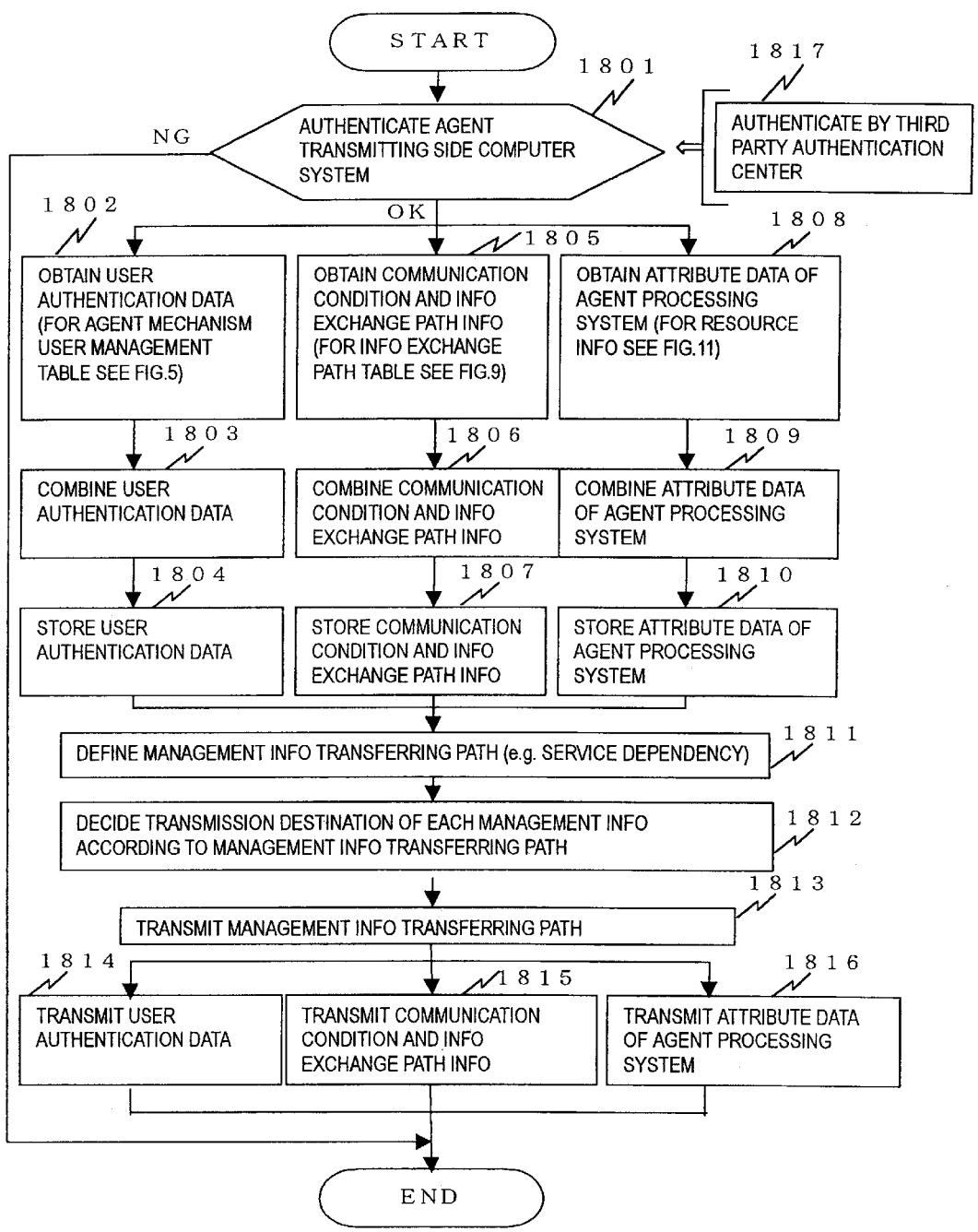
FIG. 18 illustrates a process flow including processes of transmitting a communication condition and authenticating computer system at a registry server of the present invention.

In the present embodiment, particularly, a process flow including processes of transmitting the communication condition and authenticating the computer system at the registry server is described with reference to the drawing of FIG. 18. Also in the present embodiment, a process flow for receiving and storing the communication condition by the agent transmitting side computer system is described with reference to the drawing of FIG. 19.

Hereinbelow, a specific network system is assumed for a purpose of description, however, in this example, the path database 201 of the subnet A102 which will be described later on corresponds to a registry server 1701. Also, followings correspond to a condition receiving unit and a condition storing unit of the agent transmitting side computer system: a path database 201 of the subnet D110 which is newly authenticated; a path database 201 of the subnet B103 which is already being authenticated; and a path database 201 of the subnet C106 which is also already being authenticated.

As an example of the present embodiment, a method of participating a new subnet to the agent mechanism is described. This example assumes an agent mechanism where only the subnet A102, the subnet B103, and the subnet C106 of the computer system network of FIG. 1 are participating. In addition, a case of participating a new subnet D110 to this agent mechanism is described.

A system manager of the subnet D110 obtains a required software for participating to the agent mechanism. Then, the system manager requests to a system manager of the agent mechanism for setting of a new account related to the subnet D110 to the registry server. In this example, the system manager of the agent mechanism also acts as a manager of the subnet A102. Also, the registry server is a server for managing a registry information of each subnet participating to the agent mechanism, and in this example, the path database 201 of the subnet A102 is the registry server.

Figure 13:
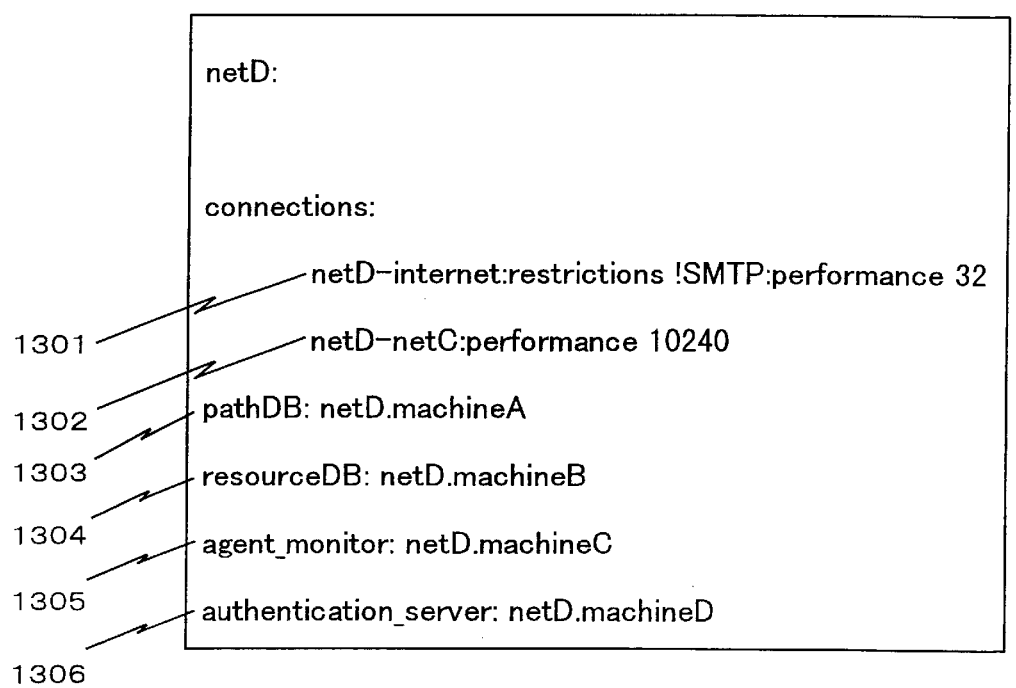
FIG. 13 illustrates an example of sub-network registration information of the present invention.

The system manager of the subnet D110 initializes the required software, and creates the sub-network registration information shown in FIG. 13 in accordance to the software.

The system manager of the subnet D110 after receiving a notification of completing a newly set account to the registry server, transmits the sub-network registration information to the registry server. At this time, the authentication server 202 of the subnet A102 which is an authentication center, confirms for a justification related to the subnet D110 by referring to the newly set account in the registry server (step 1801). Note that the sub-network registration information is encrypted before transmission.

This example assumes for a transmission using TCP via the subnet C, however, in cases when no transmission means are available at a time of participating a new subnet, the sub-network registration information is transmitted to an agent system manager via the media such as document and floppy disk, for a direct input of the information.

Accordingly, in the sub-network registration information reported to the registry server at a time of inducing service at the subnet, the following elements are included: a subnet communication connection mode (step 1805) shown in lines 1301 and 1302; a path database operating host shown in a line 1303; a resource database operating host shown in a line 1304; the agent monitor operating host shown in a line 1305; and a user authentication and management server operating host shown in a line 1306.

The line 1301 indicates that this subnet is connected to the internet at a standard data transferring rate of 32 Kbps via the firewall which only allows the SMTP to pass through. The line 1302 indicates that this subnet is connected to the subnet C106 using the leased line at the standard data transferring rate of 10 Mbps, and has no particular regulation to the types of communication protocol (step 1805).

The line 1303 indicates the a host name where the path database 201 operates (the machineA of the subnet D110), however, the path database 201 operating at this time is already in a listening status by preparing listening ports of the communication modes (SMTP and TCP) reported by each path at the lines 1301 and 1302.

Accordingly, with the participation of the subnet D110 to the system, the information exchanging path management table of the agent mechanism illustrated in FIG. 9 is amended as illustrated in the drawing of FIG. 14 (steps 1806, 1807). Specifically, following path information entries are added, as illustrated in FIG. 14: A–D shown in a line 1404, B–D shown in a line 1405, and C–D shown in a line 1406.

Then, the registry server (the path database 201 of the subnet A102) notifies an amendment of the information exchanging path management table to the path database 201 of the subnet B103 and to the path database 201 of the subnet C106 based on a service dependency (steps 1812 and 1815).

What is meant by the service dependency is that it defines a depending relationship of the services such as collection and distribution of the agent operating status data, which are supplied in a similar manner between subnets. This allows a transferring path of the management information which must be guaranteed for an identical content to be decided. This service dependency is dynamically defined based on the information exchanging path information (step 1811).

Further, the registry server (the path database 201 of the subnet A102) transmits the information exchanging path management table illustrated in FIG. 14 to the path database 201 of the subnet D110 in the listening status (steps 1812 and 1815). The path to be used at this time for transmitting using TCP via the subnet C106 is decided from the content of each path information entries of A–C shown in a line 1402 and C–D shown in the line 1406 (steps 1812, 1815 and 1909 to 1912). Also at this time, the service dependency is transmitted together (steps 1813, 1901 to 1904).

Accordingly, within the service dependency, the service of the subnet D110 is defined to position below the service of subnet C106 (step 1811). Then the path database 201 of the subnet D110 receives the previously described information exchanging path management table and the service dependency (steps 1909, 1910, 1901 and 1902) and the service that uses these will commence.

Just like a mechanism of updating the information exchanging path management table as the management information of path database 201, a management information of other services are updated by a similar mechanism. Specifically, following information are subjected to the updating: the resource information managed by the resource database 203 (see FIG. 11); the agent execution status managed by the agent monitor 204 (see Fog. 16); and the user management table managed by the user authentication and management 206 (see FIG. 5). (For updating the resource information, refer to the steps 1808 to 1810, 1816, 1913 to 1916. For updating the agent execution status, refer to the steps 2201 to 2205, 1917 to 1920. For updating the user management table, refer to the steps 1802 to 1804, 1814, and 1905 to 1908.

A procedure of the updating will be described hereinbelow. First, the registry server (the path database 201 of the subnet A102) notifies the participation of the subnet D110 to a host where each service of the subnet A102 operates. Next, each service which has received the notification updates each management information responding to needs (steps 1808 to 1810, 2201 to 2203, 1802 to 1804), and based on the service dependency (step 1811, 1812, 2204) notify an amendment of the management information to services of the subnet B103 and the subnet C106 (steps 1816, 2205, 1814). Further, each service of the subnet C106 transmits each management information which is an initial data to each service in the subnet D110 in waiting mode. The services are: resource database 203 which operates at a host shown in the line 1304; an agent monitor 204 which operates at host shown in the line 1305; and the user authentication and management 206 which operates at host shown in the line 1306 (steps 1916, 1920, 1908). At this time, similar to the case of the path database 201, the service dependency where the service of subnet D110 is defined to position below the service of the subnet C106 is transmitted together (step 1904).

Each service of the subnet D110 commences each service after receiving the service dependency and these management information (steps 1901, 1905, 1909, 1913, and 1917). In this example, for all of the services, the service of the subnet A102 is registered at an uppermost position of the service dependency (step 1811).

As described previously, after commencing each service of the subnet D110 which is newly registered, the agent processing system is initialized. The agent processing system is initialized by a manager of a host which executes the agent processing system. The host manager provides listening ports of the resource database 203 and agent monitor 204 for the subnet D110 and a resource information, and a resource information of the agent monitor 204, and initiates an agent processing system program. The resource information has items similar to the agent processing system attributes shown in FIG. 12.

As an initialization process, the agent processing system program transmits the resource information to the resource database 203 and agent monitor 204 of the subnet D110, and informs of a new participation of the agent processing system. At this time, the transmission to the resource database 203 is performed via the resource information inquiring unit 406. Also, the transmission to the agent monitor 204 is performed via the agent execution status reporting and inquiring unit 408.

The resource database 203 and the agent monitor 204 which are notified of the participation of the new agent processing system further notifies of the participation to a resource database 203 and agent monitor 204 of the subent A102 which is located at the uppermost position of the service dependency. This notification informs a service of each subnet in a similar procedure as the previously described updating process.

As described previously, the service of the each subnet repeats updating of the management information successively based on a transferred information. The drawing of FIG. 15 illustrates an algorithm which updates the management information of the service per subnet.

Figure 15:
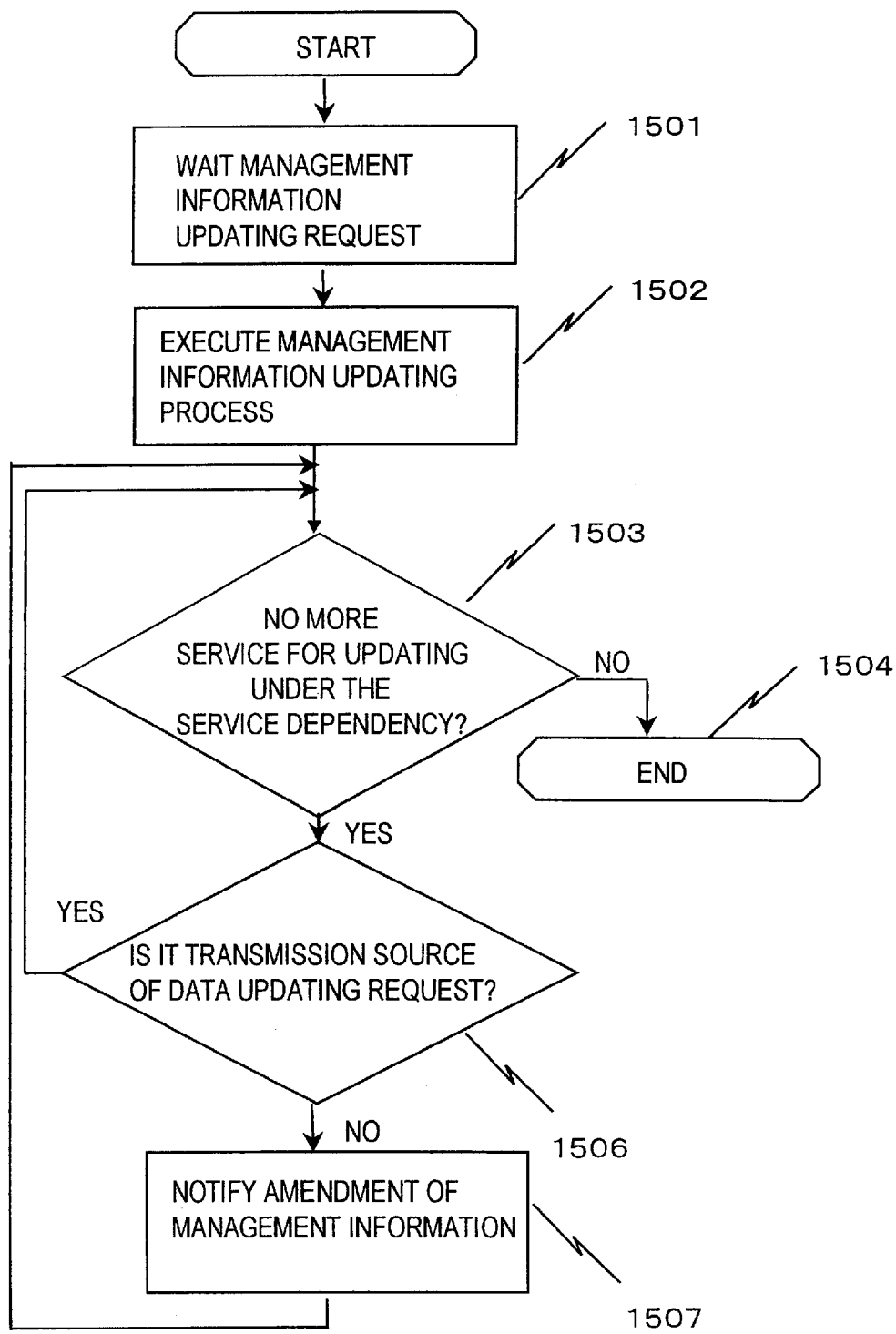
FIG. 15 illustrates an update algorithm of service management information of the present invention.

In FIG. 15, initially, the service of subnet which receives the update of management information is in waiting status for a request of the management information update as of step 1501. After a notification of the update of management information is received, this service updates the management information of the service itself in step 1502. After that in step 1503, decide whether there is any service not being updated yet at the position immediately below of the service dependency. If there's no service, the process competes without any notification of the update of management information to other services. On the other hand, if there is a service which is not updated yet, then in step 1506, the service is confirmed whether it is a service of a request source of the management information update or not, and if not, then in step 1507 notify the update of management information to no update services. By continuously linking these processing in a direction from an uppermost level service to a lower level service of the service dependency, the management information of services of all subnets are updated.

In cases of adding the new agent processing system to the agent mechanism, the following processes can be performed; obtain the digital signature from a third party authentication center; register the agent processing system using the digital signature; and commence processing of the agent processing after obtaining a permission (step 1817).

Embodiment 3

Figure 19:
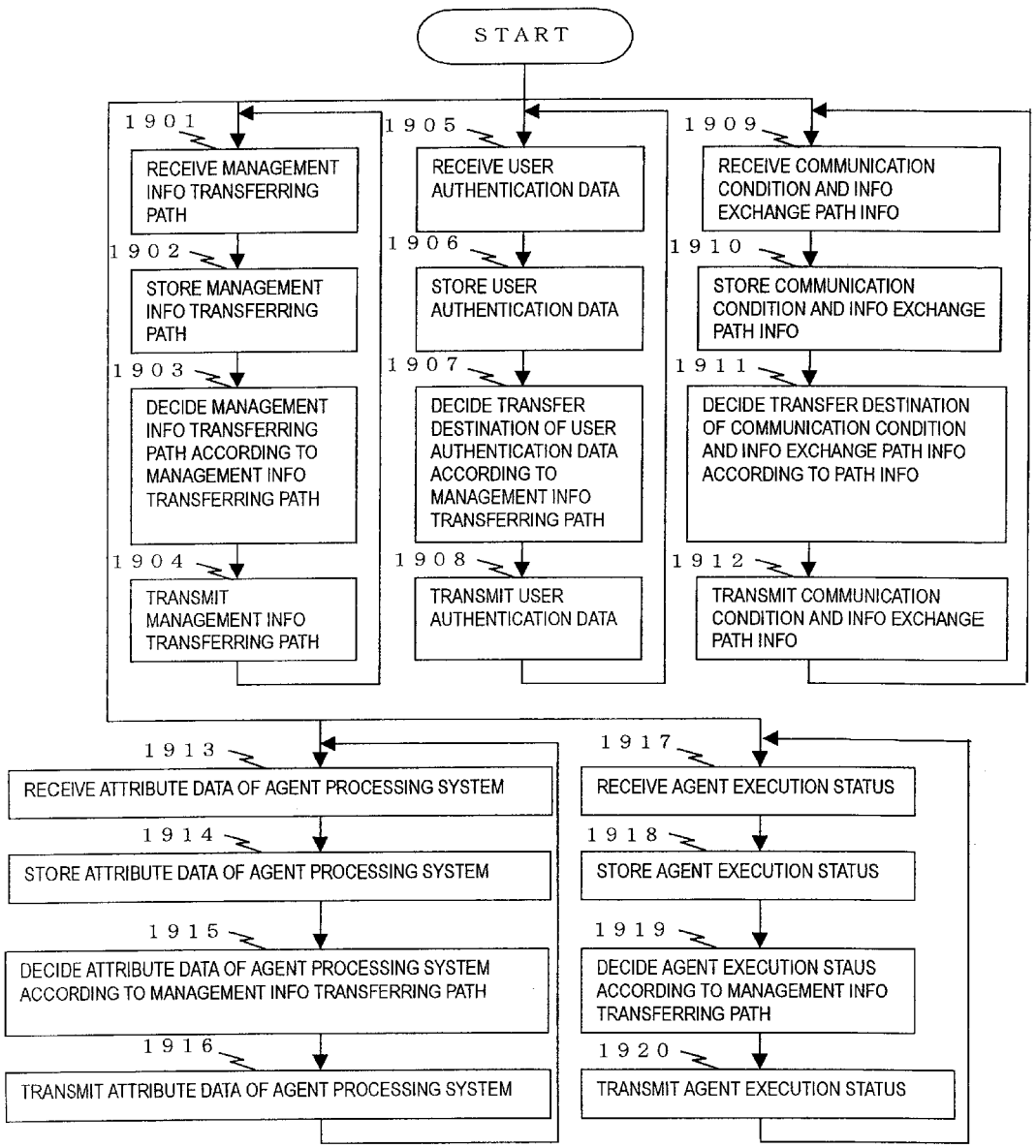
FIG. 19 illustrates a process flow including processes of receiving and storing the communication condition by an agent transmitting side computer system of the present invention.
Figure 20:
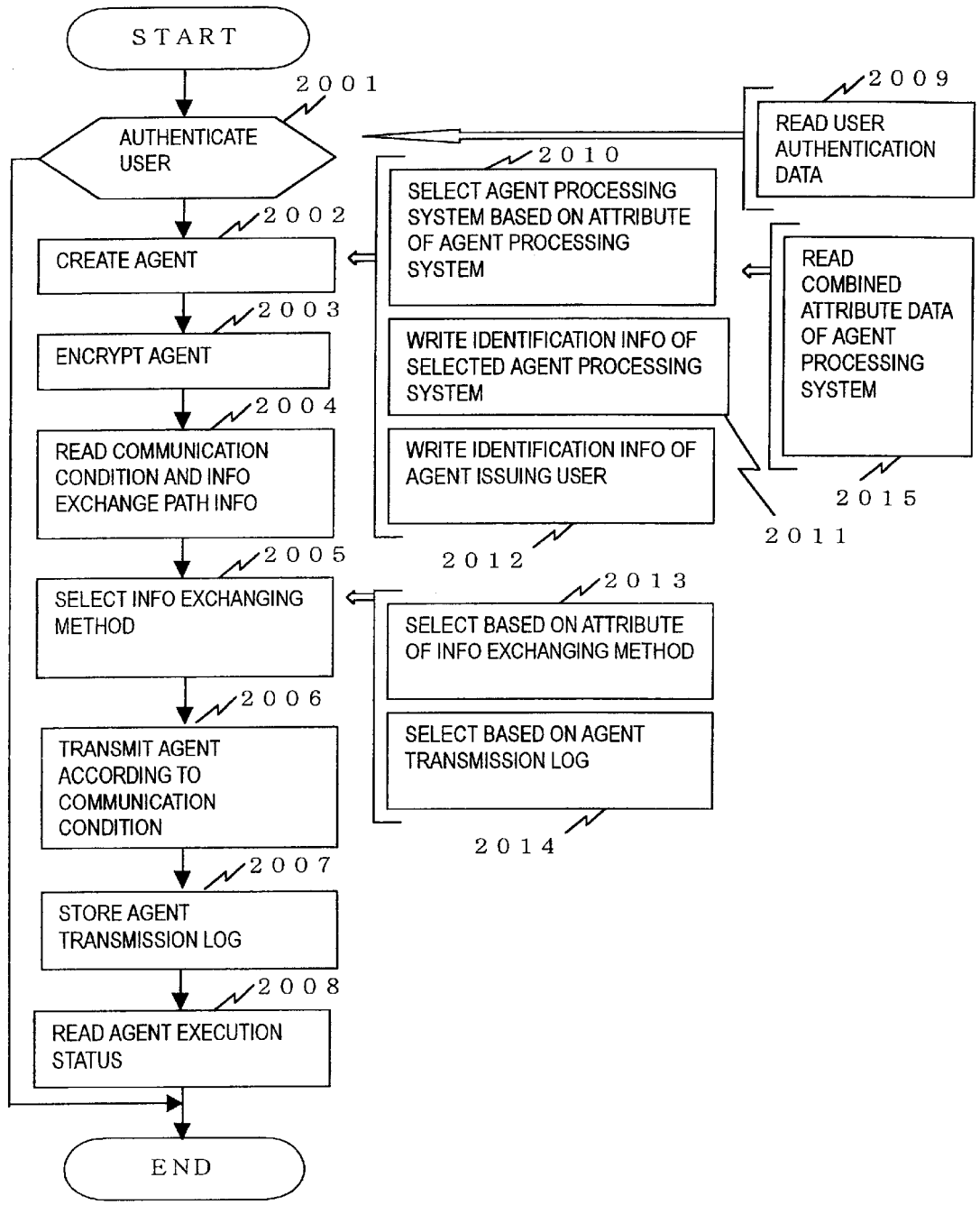
FIG. 20 illustrates a process flow including processes of creating and transmitting the agent at the agent transmitting side computer system of the present invention.
Figure 21:
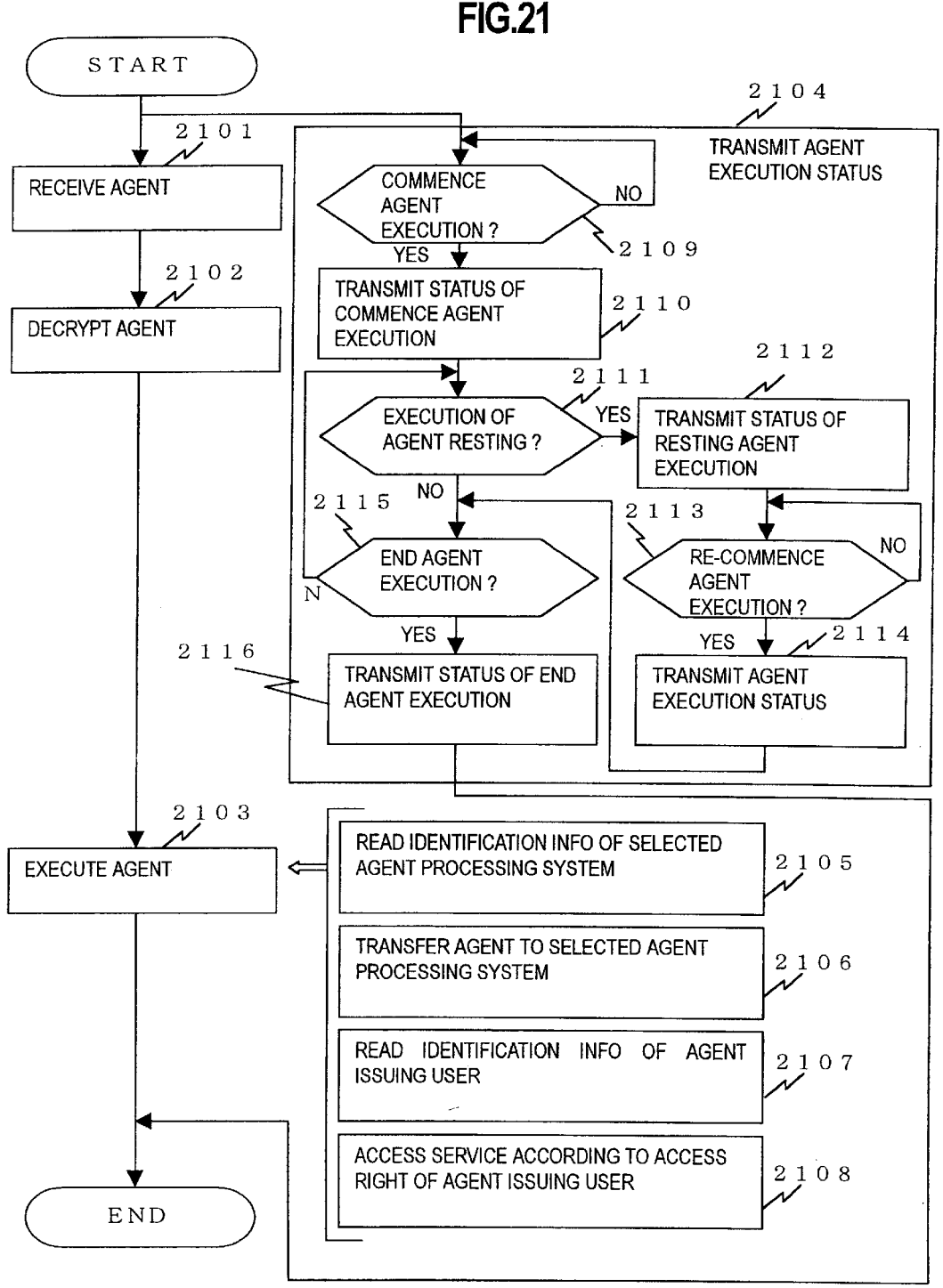
FIG. 21 illustrates a process flow including processes of receiving and executing the agent at an agent executing side computer system of the present invention.

In the present embodiment, the following processes are described: a process flow including a process of transmitting the agent execution status of step 2104 in FIG. 21 which is described in particular; a process flow including a process of combining the agent execution status in FIG. 22; a process flow including process of transferring the agent execution status of steps 1917 to 19120 of FIG. 19; and a reading process of the agent execution status of step 2008 of FIG. 20.

As an example of the present embodiment, a case of using the agent mechanism of the present invention is described, in order to disperse a load on application program. A dispersion of the load, for example, is suitable in an application program that mainly performs a calculation process.

This application program is dynamically divided into tasks, and the divided tasks are configured in formats of the agent objects including data and execution text. These tasks assume that resources such as database and file are not required except for the agent processing system. Accordingly, each task is execution possible in any one of the agent processing systems, and the application program can select the optimum agent processing system based on a situation of system load which is obtained by inquiring to the resource database 203.

This application program regards the machine1 of the subnet A102 as an agent processing system of a parent agent. Then, the parent agent issues an agent containing a task (hereinafter referred to as task agent). In this example, the agent processing system with a least load at a time of inquiry to the resource database 203 is selected, and the task agents are issued which are divided into the following four: machineA of subnet C106; machineB of subnet C106; machineA of subnet D110; and machineB of subnet D110.

Each task agent transmits a processing result information to a regulated port of the parent agent by using the information exchanging unit 404 (steps 2104, 2109 to 2116). The parent agent receives the processing result information from all task agents that are issued, and after that these are combined to end the process (steps 2201 to 2205).

In between this process, the parent agent can inquire for the agent execution status of each task to the agent monitor 204 via the agent execution status reporting and inquiring unit 408 of the agent processing system (step 2008).

The agent execution status is transmitted as described below. An agent processing system that has received the task agent reports the agent execution status at the following times: commencing time of the task agent execution; resting time of the task agent execution; re-commencing time of the task agent execution; and completing time of the task agent execution. The reporting is done to the agent monitor 204 of a subnet where the agent processing system belongs to (step 2109, 2111, 2113, and 2115).

Further, the agent monitor 204 reports the agent execution status of the subnet at an optimal timing to the agent monitor 204 which is at the uppermost level of the service dependency (2110, 2112, 2114, and 2116). At this time, in exchange of an reported agent execution status, the agent monitor 204 that has issued the report can obtain the agent execution status of other subnets from the agent monitor 204 of the uppermost level.

An agent monitor 204 positioned at a lower level than the uppermost level obtains the most recent agent execution status from an update algorithm of the management information of the service illustrated in FIG. 15 (steps 1917 to 1920).

FIG. 16 shows a result of performing the inquiry of the execution status of four task agents to the agent monitor 204 after a certain time has passed after the parent agent issues the task agents (step 2008). As can be seen from this, when a user issuing the inquiry does not specify a content of the inquiry, then an execution status of an agent issued by the user is returned.

A line 1601 in FIG. 16 illustrates an execution status of the parent agent. It is possible to see from the line that the agent ID is netA.machine1.0001. The agent processing system in execution operates at the machine1 of subnet A102. The execution status immediately before inquiring is in waiting mode for a processing result information of a child task. Lines 1602 to 1605 illustrate an execution status of task agent divided into the following four: machineA of subnet C106; machineB of subnet C106; machineA of subnet D110; machineB of subnet D110. It is possible to see from the lines 1602 and 1605 that each one of the four task agents are in execution.

Embodiment 4

A deletion method of subnet and a management method of service operating mode of a subnet participating to the agent mechanism of the present invention are described in this embodiment.

Other than managing the service dependency, the registry server checks whether the services are usable or not by periodically accessing to the service of each subnet. In cases when the registry server cannot access within a predetermined time, the registry server decides the service as "resting", and notify this decision to the service and to all the services having the service dependency of the agent mechanism. Also, the registry server attempts a similar access after the notification, and when a service reverts to a service usable mode, the service is decided as "operating", and notify this decision to all the services in a similar manner.

In cases of deleting the subnet participating to the agent mechanism, a manager of the subnet for deletion requests to the registry server for a subnet deletion. The registry server sets all the services on the subnets for deletion as "resting". After that, the registry server notifies this fact of "resting" to all the services under the service dependency of the agent mechanism. This service dependency is a service dependency of a resting service. All the services that have received this notification deletes the "resting" services from the service dependency being stored in them. The subnet is deleted from the agent mechanism this way.

All the embodiments previously described have assumed an example with the subnets configuration using the LAN, including a computer system for receiving the agent, and a computer system for transmitting the agent. However, as long as these are a computer system having function corresponding to each service of the subnet, the subnets configuration is not always necessary. Accordingly, it is possible to have a network computer system where either one or both the computer system for transmitting the agent and the computer system for receiving the agent participate to the network computer system as a single unit computer system not configuring the subnets, to become a part of the agent mechanism.

Also, as the information exchanging method, the information exchanging method using the communication media is described in the embodiments, however, the present invention can be implemented even by adopting a method of directly moving a physical memory media.

As described previously, by using the agent method of the present invention, the user can use the resources of the computer system mutually connected to internet or public channel, as if it was using a single, virtual computer, without the need of being conscious of the system configuration or a security regulation of the network. Also, a processing that relies on the agent can definitely be executed, or can be deleted, therefore, the agent system method can execute a mission critical processing.

Industrial Applicability

The present invention thus described has the following effects.

According to the present invention, a pre-determined communication condition is priory notified to the agent transmitting side computer system, and based on the communication condition the agent is transmitted through the firewall. The firewall is installed to resolve from a danger of unauthorized access and to overcome a disadvantage in cases of using an inexpensive internet as connection means. A permission to pass through the firewall is smoothly received from an access control unit. The present agent method can be adopted safely and smoothly at the intranet which is inexpensively designed. Particularly, the present invention is advantageous in performing the mission critical processing.

According to the present invention, since only an authenticated user can transmit the agent, therefore, this prevents an agent transmitted by an inappropriate user, so as to increase the safety factor.

According to the present invention, since an appropriate information exchanging method is selected based on an attribute of the information exchanging unit, therefore, even from a viewpoint of the time and expense involved in data transferring and the safety factor, the optimal agent transfer is achieved.

According to the present invention, since the agent processing system suitable for the content of agent processing can be selected based on the attribute of the agent processing system, therefore, the agent processing can effectively be executed.

According to the present invention, since the service used by the agent processing system makes access according to the access right of the agent issuing user, therefore, in case of regulating the access right for a purpose of confidential management of the inner processing of the agent executing side computer system, the agent method can maintain a given regulation, and able to attain the purpose. Also, the access right authentication process during the agent processing can be automated, and this enables to attempt a smooth running of the agent processing.

According to the present invention, since the agent issuing user can receive a report of the agent execution status by using the computer system that issued the agent, therefore, an appropriate measure can be taken in cases of the agent processing failure. Also, in cases of selecting each agent processing system, there is an advantage of being able to select the agent processing system in order to efficiently distribute the processing.

According to the present invention, since at least one part of the agent is encrypted for transmission, therefore, a secrecy of the agent is maintained even if a third party may happened to be observing during the communication. Also, an unauthorized agent is removed and this maintains the safety factor.

In cases when a system comprises a plurality of the agent executing side computer systems, when the agent executing side computer system notifies pre-determined communication conditions separately to the agent transmitting side computer system, the management of communication conditions at the agent transmitting side computer system becomes rather complex. In the present invention, a single notification includes the communication conditions of all other agent executing side computer systems, therefore, all of the communication conditions are updated at once, and this will decrease a load put on managing the communication conditions.

According to the present invention, since the agent transmission log stores the identification information of the information exchanging method, therefore, able to select the optimal information exchanging method based on the agent transmission result per information exchanging method, which can practically increase the transferring efficiency of the agent.

According to the present invention, since the authentication of the agent transmitting side computer system is performed based on the authentication result of the third party authentication center, therefore, the justification of the agent transmitting side computer system is guaranteed, and the safety factor of the agent method will improve.

According to the present invention, since a plurality of agent transmitting side computer systems have identical user authentication data, the authorized user can transmit agent from any one of the agent transmitting side computer systems by using a same user authenticating procedure, such that the convenience factor for the user improves.

According to the present invention, since the agent transmitting side computer system keeps an attribute of the agent processing system as a database, therefore, the agent processing system can be selected rapidly and comprehensively.

According to the present invention, since the agent execution statuses of the other agent executing side computer systems are obtained altogether, therefore, in cases of disperse processing the agent to the plurality of agent executing side computer systems, each execution status is obtained at once by the agent transmitting side computer systems, and the load put on the execution status management is reduced. Also, the convenience factor of the user will improve.

According to the present invention, since the communication condition that are maintained consistent between the plurality of agent transmitting side computer systems is transmitted according to the management information transferring path based on the information exchanging path information, therefore, a most recent communication condition is shared by all the agent transmitting side computer systems safely and quickly, such that the agent transmission is smoothly performed.

According to the present invention, since the agent execution status between the plurality of agent executing side computer systems are transmitted according to the management information transferring path based on the information exchanging path information, therefore, a wide-ranging agent execution status is obtained safely and quickly.

According to the present invention, since the agent executing side computer system comprises a plurality of computer systems to form a network system, therefore, the user can use various services supplied by the network system from remote.

According to the present invention, since the agent transmitting side computer system comprises a plurality of computer systems to form a network system, therefore, the user can use a service using the agent method with many computer systems as an operating unit.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An agent method for transferring an agent inside a network system including a first computer system and a second computer system, the first computer system having an access control unit which allows access in case of meeting a pre-determined communication condition of the first computer system, comprising:

authenticating the second computer system responsible for transmitting the agent, and transmitting the pre-determined communication condition of the first computer system to the authenticated second computer system;

receiving and storing, at the second computer system, the pre-determined communication condition of the first computer system, creating the agent at the second computer system, and transmitting the agent from the second to the first computer system; wherein said transmitting the agent is carried out according to the pre-determined communication condition of the first computer system; and receiving the agent via the access control of the first computer system unit and executing the agent with the first computer system.

2. The agent method according to claim 1 further comprising authenticating an agent issuing user.

3. The agent method according to claim 2 further comprising transmitting a user authentication data, and receiving and storing the user authentication data by a plurality of the second computer systems, wherein the step of authenticating the agent issuing user includes reading the user authentication data by the second computer system.

4. The agent method according to claim 1, wherein the first computer system can use a plurality of information exchanging methods; and wherein the agent method further comprises selecting an information exchanging method based on an attribute of the information exchanging method of the first computer system by the second computer system.

5. The agent method according to claim 1, wherein the first computer system has a plurality of agent processing systems that can execute the agent; wherein the step of creating the agent includes selecting the agent processing system based on an attribute of the agent processing system and writing an identification information of the selected agent processing system to a part of the agent; wherein the step of executing the agent includes reading the identification information of the selected agent processing system and transferring the agent to an agent processing system specified by the identification information.

6. The agent method according to claim 5 further comprising combining attribute data of the agent processing systems, wherein the step of selecting the agent processing system includes reading combined attribute data of the agent processing systems.

7. The agent method according to claim 1, wherein the step of creating the agent includes writing an identification information of an agent issuing user to a part of the agent; wherein the step of executing the agent includes reading the identification information of the agent issuing user and accessing a service according to an access right of the agent issuing user specified by the identification information.

8. The agent method according to claim 1 further comprising transmitting an agent execution status of the first computer system and receiving the agent execution status by the second computer system.

9. The agent method according to claim 8 further comprising combining the agent execution statuses.

10. The agent method according to claim 8 further comprising defining a management information transferring path based on an information exchange path information, and deciding a transmitting destination of the agent execution status according to the management information transferring path.

11. The agent method according to claim 1 further comprising encrypting at least a part of the agent by the second computer system, and decrypting the encrypted part of the agent by the first computer system.

12. The agent method according to claim 1 further comprising combining the pre-determined communication conditions of a plurality of the first computer systems.

13. The agent method according to claim 12 further comprising defining a management information transferring path based on an information exchange path information, and deciding a transmitting destination of the pre-determined communication condition according to the management information transferring path.

14. The agent method according to claim 1, wherein the second computer system can use a plurality of information exchanging methods, wherein the agent method further comprises storing an agent transmission log including an identification information of the information exchanging method used in transmitting the agent, and selecting the information exchanging method based on the agent transmission log by the second computer system.

15. The agent method according to claim 1, wherein the step of authenticating the second computer system includes authenticating by a third party authenticating center.

16. A computer system having an accessible access control unit in case of meeting a pre-determined communication condition, and for communicating with an other computer system, comprising:

a computer system authenticating unit for authenticating the other computer system for transmitting an agent;

a communication condition transmitting unit for transmitting the pre-determined communication condition to the authenticated other computer system;

an agent receiving unit for receiving the agent from the authenticated other computer system via the access control unit; and an agent execution unit for executing the received agent.

17. A network system having a plurality of computer systems according to claim 16.

18. A computer system for communicating with an other computer system having an accessible access control unit in case of meeting a pre-determined communication condition, comprising:

a communication condition receiving unit for receiving the pre-determined communication condition of the other computer system;

a communication condition storing unit for storing the pre-determined communication condition of the other computer system;

an agent creating unit for creating an agent to be executed in the other computer system; and an agent transmitting unit for transmitting the agent according to the pre-determined communication condition of the other computer system.

19. A network system having a plurality of computer systems according to claim 18.

* * * * *